United States Patent
Kang

(10) Patent No.: US 7,178,641 B2
(45) Date of Patent: Feb. 20, 2007

(54) AUTOMOBILE BRAKE CALIPER FOR REDUCING NOISE

(75) Inventor: Dong-Hoon Kang, Kyungki-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/229,253

(22) Filed: Aug. 27, 2002

(65) Prior Publication Data

US 2003/0042085 A1    Mar. 6, 2003

(30) Foreign Application Priority Data

Sep. 6, 2001  (KR) .............................. 2001-54740

(51) Int. Cl.
*F16D 65/40*    (2006.01)

(52) U.S. Cl. .................................................. 188/73.38

(58) Field of Classification Search ............. 188/73.38, 188/73.31, 73.35, 73.36, 73.37
See application file for complete search history.

(56) References Cited

U.S. PATENT DOCUMENTS

| 4,061,209 A | 12/1977 | Gee et al. | |
| 4,342,381 A | 8/1982 | Tamura | |
| 4,360,079 A * | 11/1982 | Belart | 188/73.34 |
| 4,392,561 A * | 7/1983 | Watanabe | 188/73.36 |
| 4,527,667 A * | 7/1985 | Courbot | 188/73.34 |
| 4,527,668 A | 7/1985 | Davidson | |
| 4,846,312 A | 7/1989 | Sweetmore et al. | |
| 4,881,623 A | 11/1989 | Kondo | |
| 4,890,698 A | 1/1990 | Le Deit | |
| 5,358,079 A * | 10/1994 | Brown | 188/73.38 |
| 5,573,087 A | 11/1996 | Bae | |
| 5,746,292 A | 5/1998 | Tanaka et al. | |
| 5,860,495 A | 1/1999 | Weiler et al. | |

FOREIGN PATENT DOCUMENTS

| DE | 3244790 C2 | 4/1991 |
| EP | 0032462 | 4/1984 |

* cited by examiner

*Primary Examiner*—Xuan Lan Nguyen
(74) *Attorney, Agent, or Firm*—Morgan Lewis & Bockius LLP

(57) ABSTRACT

An automobile brake caliper for reducing noise is disclosed. An elastic member is installed so that elastic forces can act between the respective components. Thus, when the automobile generates vibrations while running over a rough terrain, the adjacent components avoid frictional contact, thereby eliminating any impact noise.

2 Claims, 3 Drawing Sheets

AUTOMOBILE BRAKE CALIPER FOR REDUCING NOISE

FIELD OF THE INVENTION

The present invention relates to an automobile brake caliper for reducing noise, and more particularly, to an automobile brake caliper including an elastic member dampening the moveable parts against vibration.

BACKGROUND OF THE INVENTION

When a disc brake is engaged, the pressing of the pedal by the driver is converted to hydraulic pressure through a booster and a master cylinder so as to transmit the hydraulic pressure to a caliper. Then the caliper presses a disc fixed with pads utilizing the hydraulic pressure, thereby generating a braking force.

However, in conventional brake systems, rattle noise will frequently occur when an automobile runs over a rough terrain. Rattle noise is generated from the impact of the movement of two or more metal components when they collide by external forces. In the conventional caliper, rattle noise is generated when the components such as the caliper housing, the shoe and the mounting bracket collide due to the vibrations caused when the automobile runs over a rough terrain.

Conventionally, in order to reduce this rattle noise, various measures have been researched. Among the methods, there is one in which the caliper components are subjected to smaller tolerances to improve the precision. In this method, however, the improvement of the precision is accompanied by an increase in the manufacturing cost, and defective products are frequently generated. Accordingly, this method has not been effective. Further, when the caliper is used for a long time, the actuation parts of the components wear out, thereby regenerating the rattle noise.

SUMMARY OF THE INVENTION

The present invention provides an automobile brake caliper in which elastic forces are applied between the components of the caliper to provide a dampening effect, whereby even if the automobile is subject to frequent vibrations when running over rough terrain, the components of the caliper avoid frictional contact, thereby reducing or preventing rattle noise.

According to an embodiment of the present invention, the brake caliper includes a caliper housing with a mounting bracket for slidably supporting the caliper housing along guide pins. A piston is accommodated within the caliper housing, which moves in response to external hydraulic pressure. A shoe cooperates with the piston to press upon a disc via the piston. An elastic member is disposed between the shoe and a bridge part of the caliper housing. The elastic member exerts a sustained elastic force between the shoe and the bridge part.

In an alternative embodiment, an automobile brake caliper comprises a caliper housing with a first part defining a cylinder and a bridge part extending from the first part and supporting a finger part facing the cylinder. A piston is received within the cylinder. A first shoe is mounted on the cylinder and a second shoe mounted on the finger part such that a disc of a disc brake may extend therebetween. An elastic member is disposed between at least one of the shoes and the bridge part. The elastic member exerts an elastic force against the shoe to eliminate unwanted vibration of the parts and associated rattle noise. Preferably, the elastic member is disposed between the bridge part and both the first and second shoes, and exerts force against both shoes. In a preferred alternative embodiment, the bridge part defines an installing slot configured and dimensioned for installation of the elastic member between the bridge part and at least one shoe after assembly of the brake caliper.

BRIEF DESCRIPTION OF THE DRAWINGS

The above object and other advantages of the present invention will become more apparent by describing in detail the preferred embodiments of the present invention with reference to the attached drawings in which.

DETAILED DESCRIPTION OF THE INVENTION

Hereinafter, the preferred embodiment of the present invention will be described in detail by referring to the attached drawings. Here, the elements which are identical to the conventional elements will be assigned with identical reference numbers.

Figure 1:
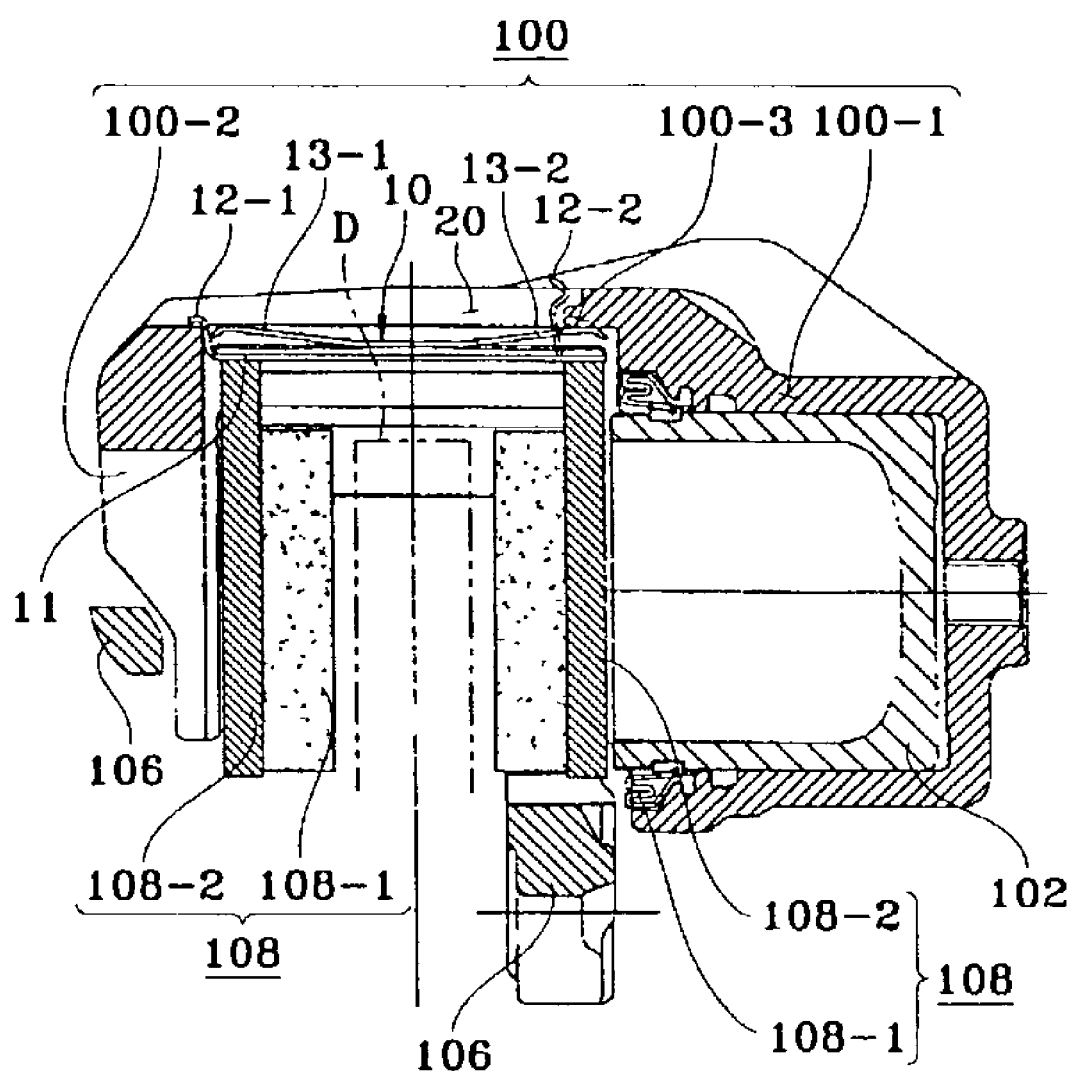
FIG. 1 is an assembled sectional view of an automobile brake caliper for reducing noise according to the present invention.
Figure 2:
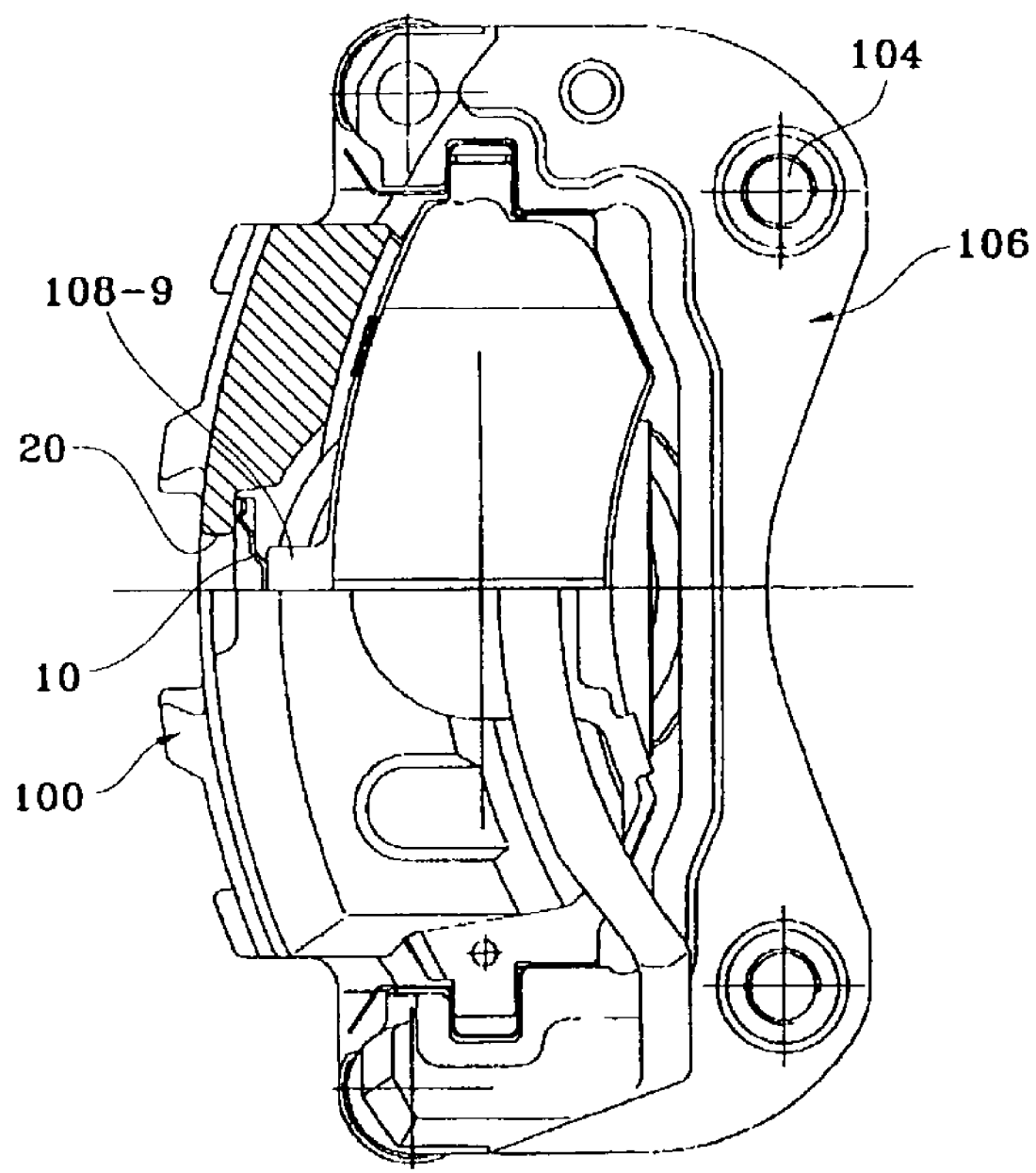
FIG. 2 is a sectional side view of the caliper of FIG. 1.

A preferred embodiment of the present invention is shown in FIGS. 1 and 2. Caliper housing 100 includes a cylinder 100-1 that allows piston 102 to move in response to hydraulic pressure. Finger part 100-2 faces toward the cylinder 100-1. Bridge part 100-3 joins the cylinder 100-1 and the finger part 100-2 such that the disc D may be disposed therebetween. A mounting bracket 106 is secured to a knuckle of the automobile wheel to slidably support the caliper housing 100 along guide pins 104. Piston 102 is received in cylinder 100-1 and moves in response to a supplied hydraulic pressure. Shoe 108 comprises a pad 108-1 and a back plate 108-2, the pad 108-1 preferably being attached to the back plate 108-2 with an adhesive.

An elastic member 10 preferably is installed between the shoe 108 and the bridge part 100-3 of the caliper housing, so that sustained pressure can be exerted between the bridge part 100-3 and the shoe 108. The elastic member 10 may be installed through an installing hole 20 in bridge part 100-3, facilitating assembly and disassembly.

Figure 3:
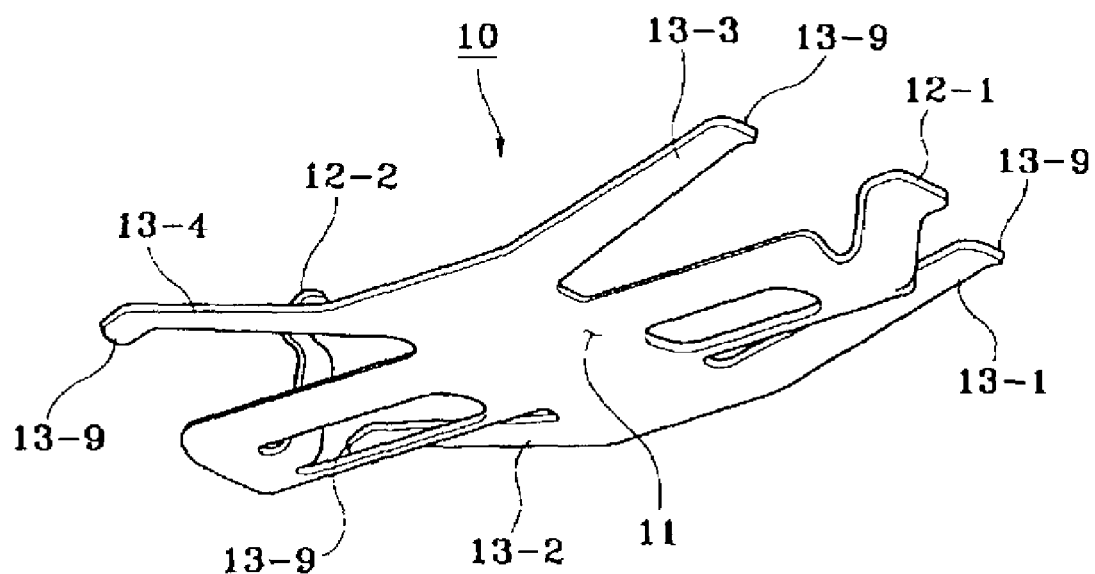
FIG. 3 is a perspective view of an elastic member as a component of the automobile brake caliper according to the present invention.

As shown in FIG. 3, the elastic member 10 is preferably made of a flat elastic sheet, and is formed by cleaving and bending the sheet. A pressing part 11 is elongately formed along the direction of the sliding of the shoe 108, for contacting and applying an elastic force onto the shoe 108. A hook part 12 is bent from the pressing part 11 to secure the elastic member 10 to the caliper housing 100 when inserted through the installing hole 20. An elastic part 13 is bent at a slight incline toward the bridge part 100-3 of the caliper housing, for applying an elastic force between the caliper housing 100 and the pressing part 11.

According to a further preferred embodiment, hook part 12 includes a first hook 12-1 extending from one end of the flat sheet forming the pressing part 11 and a second hook 12-2 formed at an end opposite from the first hook 12-1 by cleaving a part of the flat sheet forming the pressing part 11.

Also, elastic part 13 preferably includes a first, second, third and fourth elastic plates 13-1, 13-2, 13-3 and 13-4, each extending in the longitudinal direction from the middle portion of the pressing part 11. Each of the first, second, third and fourth elastic plates 13-1, 13-2, 13-3 and 13-4 has a bent end 13-9 configured to bear against the caliper housing 100.

The above described elastic member 10 may be initially installed when the caliper is manufactured. However, when a caliper is new, almost no rattle noise is generated, because wear has not occurred yet. Thus, one advantage of a preferred embodiment of the invention is that elastic member 10 need not be installed in a new caliper. Because the installing slot 20 is formed on the caliper housing 100, after the caliper is subjected to wear and tear, the elastic member 10 can be later installed. The installation of the elastic member 10 is completed by fitting the first hook 12-1 and the second hook 12-2 into the installing slot 20 of the caliper housing 100.

When elastic member 10 is installed on the caliper housing 100, the bent ends 13-9 of the first, second, third and fourth elastic plates 13-1, 13-2, 13-3 and 13-4 come into contact with the bridge part 100-3 of the caliper housing 100 to build up an elastic force. Accordingly, the elastic forces of the first, second, third and fourth elastic plates 13-1, 13-2, 13-3 and 13-4 are exerted between the bridge part 100-3 of the caliper housing and the pressing part 11.

Figure 4:
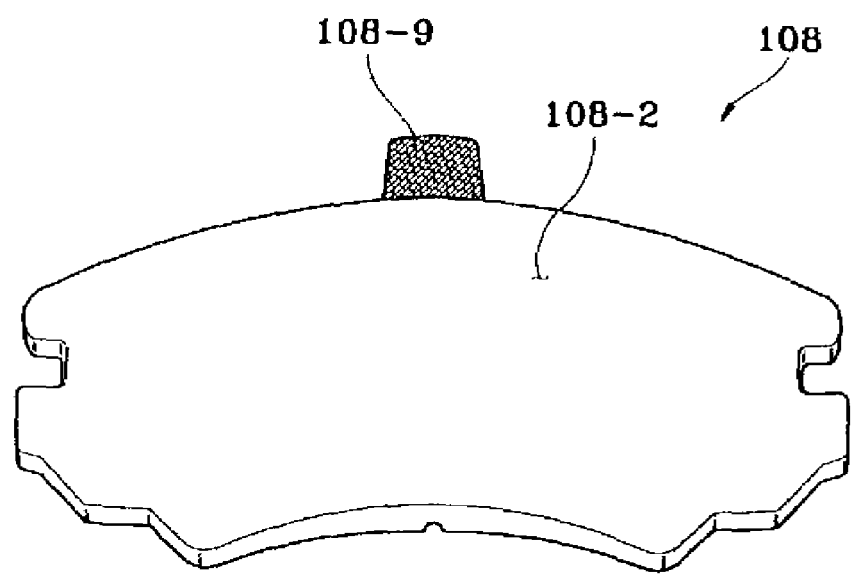
FIG. 4 illustrates a shoe used in the preferred embodiment of the present invention.

As shown in FIG. 4, shoe 108 is provided with a protrusion part 108-9 on the back plate 108-2. The protrusion part 108-9 projects toward the elastic member 10 for contact. The length of the protrusion part 108-9 is preferably determined so that the leading end of the protrusion part 108-9 slightly pushes the pressing part 11 of the elastic member 10, thereby making it possible to transmit the elastic force of the elastic member 10 to the shoe 108.

As described above, the elastic member 10 is inserted between the caliper housing 100 and the shoe 108, so that the elastic forces of the first, second, third and fourth elastic plates 13-1, 13-2, 13-3 and 13-4 elastically support the shoe 108 through the pressing part 11 at all times. The force transmitted to the shoe 108 is further transmitted to the mounting bracket 106. Therefore, any unnecessary contact is prevented between the mounting bracket 106 and the shoe 108, and between the mounting bracket 106 and the caliper housing 100, the latter two being slidably connected along the guide pins 104.

In this manner, the elastic forces transmitted from the elastic member 10 to the respective components of the caliper eliminate any contact between the respective components. Thus, rattle noise which may otherwise be generated from the frictional contact between the components is prevented. Of course, the magnitude of the elastic force has to be such that it does not impede the actuation of the components. Therefore, when the brake actuates, the pressing of the shoe 108 toward the disc D, via the pressure of the piston 102, and the release of the shoe 108 upon releasing pressure within the cylinder 100-1 will be smooth.

According to the present invention as described above, an elastic member is installed so that elastic forces can act between the respective components. Thus, when the automobile is subjected to vibrations while running over a rough terrain, the adjacent components avoid frictional contact, thereby eliminating any impact noise.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An automobile brake caliper, comprising:
   a caliper housing with a first part defining a cylinder and a bridge part extending from the first part and supporting a finger part facing said cylinder;
   a piston received within the cylinder;
   a first shoe mounted on said cylinder and a second shoe mounted on said finger part such that a disc of a disc brake extends there between; and
   an elastic member disposed between at least one of said first and second shoes and said bridge part, said elastic member exerting an elastic force against said shoe, wherein:
   said elastic member comprises a central pressing part with first and second hooks extending from opposite sides of said pressing part, said first and second hooks being asymmetrically formed with respect to said pressing part;
   said elastic member is formed from a sheet of elastic material with the first and second hooks each bent to extend from one side of said member;
   each said hook comprises an upstanding part joined with the flat sheet by a bent section;
   the hook shaped sections formed at free ends of said hooks face in a common direction; and
   said bridge part defines an installing slot configured and dimensioned for installation of the elastic member between the bridge part and at least one of said first and second shoes after assembly of the brake caliper, wherein said installation of the elastic member comprises fitting said first and second hooks in said installing slot.

2. The automobile brake caliper of claim 1, wherein said elastic member is disposed between the bridge part and both the first and second shoes, and exerts force against both shoes.

* * * * *